US012722030B2

(12) United States Patent
Cowell et al.

(10) Patent No.: US 12,722,030 B2
(45) Date of Patent: Sep. 1, 2026

(54) APPARATUS FOR SUPPORTING A PERSON AT HEIGHT

(71) Applicant: TREEMAGINEERS LTD, Pitlochry (GB)

(72) Inventors: Christopher Sidney Cowell, Pitlochry Perth & Kinross (GB); Elliot James Tanner, Montgomery Powys (GB)

(73) Assignee: TREEMAGINEERS LTD, Pitlochry (GB)

( * ) Notice: Subject to any disclaimer, the term of this patent is extended or adjusted under 35 U.S.C. 154(b) by 1240 days.

(21) Appl. No.: 17/280,015

(22) PCT Filed: Sep. 23, 2019

(86) PCT No.: PCT/GB2019/052661
§ 371 (c)(1),
(2) Date: Mar. 25, 2021

(87) PCT Pub. No.: WO2020/065279
PCT Pub. Date: Apr. 2, 2020

(65) Prior Publication Data

US 2021/0393998 A1 Dec. 23, 2021

(30) Foreign Application Priority Data

Sep. 26, 2018 (GB) ..................................... 1815717

(51) Int. Cl.
*A62B 35/00* (2006.01)

(52) U.S. Cl.
CPC ...... *A62B 35/0012* (2013.01); *A62B 35/0037* (2013.01); *A62B 35/0018* (2013.01)

(58) Field of Classification Search
CPC ............ A62B 35/0012; A62B 35/0037; A62B 35/0018; A62B 35/0025; A62B 35/0031
(Continued)

(56) References Cited

U.S. PATENT DOCUMENTS 3,448,826 A * 6/1969 Rosenblum ........ A62B 35/0037 182/3
6,125,966 A * 10/2000 Jones ................ A62B 35/0018 182/6
(Continued)

FOREIGN PATENT DOCUMENTS

EP 3162411 * 5/2017 ............ A62B 35/00
EP 3 228 363 10/2017
(Continued)

OTHER PUBLICATIONS

International Search Report and Written Opinion of the ISA for PCT/GB2019/052661 dated Nov. 7, 2019, 9 pages.

*Primary Examiner* — James O Hansen
(74) *Attorney, Agent, or Firm* — NIXON & VANDERHYE

(57) ABSTRACT

An apparatus for supporting a person working at height includes a harness and seat assembly. The seat assembly includes a supporting platform, flexible connection members secured to the platform, and a connector on each flexible connection member. The harness has two forward connection arrangements and a flexible load-bearing member extending between the forward connection arrangements, the forward connection arrangements transferring load from the back and the leg loops to the load-bearing member. Each forward connection arrangement includes a body permanently connected to the harness and a retainer to secure the flexible load-bearing member to the body, and an attachment aperture through which a respective connector is passed to releasably connect the connector and the attached connection member to the forward connection member. Thus, a load carried on the supporting platform is transferred
(Continued)

through the connection members, the connectors and the forward connection arrangement to the flexible load-bearing member.

18 Claims, 8 Drawing Sheets

(58) Field of Classification Search
USPC .............................................................. 182/3
See application file for complete search history.

(56) References Cited

U.S. PATENT DOCUMENTS

| | | | | |
|---|---|---|---|---|
| 6,223,854 | B1 * | 5/2001 | Nolz | A63B 27/00 182/7 |
| 8,220,589 | B2 * | 7/2012 | Hede | A62B 35/0012 182/7 |
| 8,333,262 | B1 | 12/2012 | Carpenter et al. | |
| 2005/0139419 | A1 * | 6/2005 | Green | A01M 31/02 182/3 |
| 2009/0314578 | A1 * | 12/2009 | Hede | A62B 35/0012 182/3 |
| 2015/0202474 | A1 * | 7/2015 | Botti | A62B 35/0025 182/3 |

FOREIGN PATENT DOCUMENTS

| | | |
|---|---|---|
| EP | 3 332 840 | 6/2018 |
| WO | 2018/051068 | 3/2018 |

* cited by examiner

APPARATUS FOR SUPPORTING A PERSON AT HEIGHT

This application is the U.S. national phase of International Application No. PCT/GB2019/052661 filed Sep. 23, 2019 which designated the U.S. and claims priority to GB Patent Application No. 1815717.2 filed Sep. 26, 2018, the entire contents of each of which are hereby incorporated by reference.

BACKGROUND TO THE INVENTION

Field of the Invention

The present invention relates to apparatus for supporting a person at height It has particular, but not exclusive application to apparatus for supporting a person working at height, for example in the fields of arborism, building construction maintenance or work on the hulls or rigging of marine vessels.

SUMMARY OF THE PRIOR ART

It is well-known for a person working at height to be supported from a working line through a harness. Various proposals have been made to ensure that such harnesses are as comfortable as possible for a user during prolonged use. While these have been successful, and are useful in many applications, during prolonged suspension of a user during working at height an extra level of comfort and stability is sometimes required. One way to achieve this is by using a bosun's seat (also known as bosun's chair or boatswain's chair). This is essentially a simple seat that can be attached to or is integral to a harness structure. Addition of a bosun's seat to a harness changes the way in which a user's weight is carried, from that of suspending a user's weight using back and thigh bands to supporting a user from beneath in a sitting position in much the same way as a normal chair.

Although a bosun's seat may be more comfortable than a harness, there are applications where use of a harness is preferred, such as where space is restricted or maximum manoeuvrability is required, for instance when working in a tree canopy. There is therefore a demand for providing means by which a bosun's seat can be added to a harness when required to offer a user maximum flexibility.

An example of a seat that can be used in combination with a harness is disclosed in U.S. Pat. No. 8,220,589. That seat can be attached to a harness at a ventral point on the harness and becomes an integral load bearing component of the harness assembly or it can be attached to the forward hardware in the instance of a typical arborist's harness. The seat of U.S. Pat. No. 8,220,589 can be restrained behind the user when not in use so it is out of the way to allow improved freedom of movement, but this still restricts some aspects of use.

SUMMARY OF THE INVENTION

An aim of this invention is to provide a combination of a harness and a seat in which the seat can be attached to or removed from the harness conveniently when required by a user. In EP-A-3 332 840, the contents of which are incorporated into this specification by reference, the present applicant proposes a harness that incorporates improved forward connection arrangements that incorporate a variety of connection assemblies which include a body that is permanently connected to the harness and a retention component that can be removably and rigidly connected to the body to removably secure the flexible load-bearing member to the body. The present invention uses a harness that has components some of which can be considered to be modifications of the forward connection arrangements of EP-A-3 332 840.

To this end, the present invention provides Apparatus for supporting a person working at height comprising a harness and a seat assembly:

- the seat assembly comprising a supporting platform, flexible connection members secured to the supporting platform, and a connector on each flexible connection member;
- the harness comprising two forward connection arrangements and a flexible load-bearing member that extends between the forward connection arrangements, the forward connection arrangements serving to transfer load from the back and the leg loops to the load-bearing member, wherein each forward connection arrangement comprises:
- a body that is permanently connected to the harness and a retainer to secure the flexible load-bearing member to the body, and
- an attachment aperture through which a respective connector is passed to releasably connect the connector and the attached flexible connection members to the forward connection assembly; whereby
- a load carried on the supporting platform is transferred through the connection members, the connectors and the forward connection arrangement to the flexible load-bearing member. This arrangement allows a seat assembly to be combined with a harness with the load from the seat assembly being transmitted through the forward connection arrangements. Since these are widely spaced-apart across a user's body, potentially uncomfortable pinching forces are avoided. When the seat is not required, the connectors are simply released from the connection members, allowing the seat to be removed. Additionally, this gives the designer of such a system certainty as to how and where loads from the seat will be transmitted into the harness.

The attachment aperture of one or both forward connection arrangement may be formed within the body. For example, an attachment aperture extends through a generally planar part of the body of a respective attachment arrangement in a direction normal to the plane. Alternatively or additionally, an attachment aperture extends through a generally planar part of the body of a respective attachment arrangement in a direction parallel to the plane. In such embodiments, the attachment aperture may be centred about an axis that is offset from the plane. For example, the attachment aperture may be formed through a projecting boss that is part of the body.

The attachment aperture of one or both forward connection arrangement may be formed within the retainer. Specifically, an attachment aperture may extend through the retainer or a part thereof. Alternatively, an attachment aperture may extend through a component secured to the body. Such a component may be secured to the body in one of several configurations to provide an attachment aperture in one of several orientations.

One or each retainer may be releasably connected to the body whereby the flexible load-bearing member can be disconnected from the harness. The flexible load-bearing member may be releasably connected to a retainer whereby the flexible load-bearing member can be disconnected from the harness.

The connectors are typically carabiners or shackles.

The flexible connection members are preferably adjustable in length.

Embodiments of the invention may include a harness of various types with which use of a seat might prove advantageous, which harnesses include a forward connection arrangement These include (but are not limited to) a work-positioning sit harness and a full-body harness.

DETAILED DESCRIPTION OF THE PREFERRED EMBODIMENTS

Embodiments of the invention will now be described in detail, by way of example, and with reference to the accompanying drawings.

In the following description, the features described are to be considered as optional features of embodiments of the invention and features described with reference to one embodiment may be incorporated into another.

Figure 1:
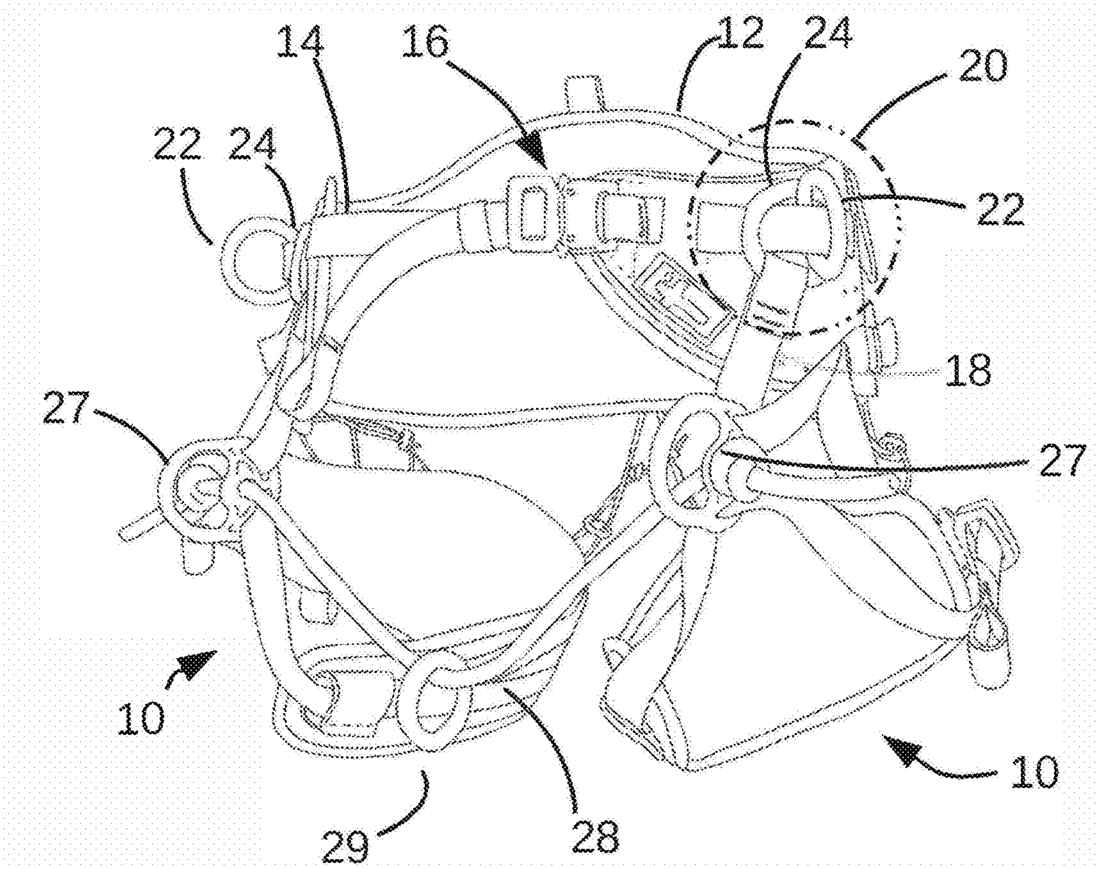
(Prior Art) Fig 1
FIG. 1 shows the basic construction of a harness of a type that forms part of an embodiment of the invention.

This application relates to the components of a harness assembly which is of the general construction shown in FIG. 1.

A known harness is shown in FIG. 1. The harness comprises two leg loops 10 that, in use, encircle a user's thighs. Each leg loop 10 is connected to a padded back 12 that rests against the small of a user's back and has side wings that extend around and/or above a user's hips when in use. The back has a waist webbing 14 that has ends that can be interconnected by a releasable front waist buckle 16.

Each side wing has a side attachment arrangement 20. Each side attachment arrangement 20 connects the waist webbing 14 in the region of the wing through a riser webbing 18 to the corresponding leg loop 10. In this known arrangement, the side attachment arrangement 20 comprises two metal loops 22, 24 through which the waist webbing 14 passes.

Traditional harnesses use a pair of symmetric forward attachment arrangements 27 as shown in FIG. 1 to suspend a flexible load bearing member 28 (also known as a "rope bridge") across the front of the harness. For use, the flexible load-bearing member 28 carries a sliding attachment device 29 which attaches to a climbing line. Typical known forward attachment arrangements include a connector 27 shown in FIG. 2 that is sewn into the riser 18 and leg loop 10 webbing. The flexible load-bearing member 28 is tied into the connector 27 during manufacture of the harness. The flexible load bearing member 28 can be adjusted in length by repositioning a knot on the one end by the user which is time-consuming and potentially hazardous for the user if done incorrectly.

A harness embodying the invention has forward attachment arrangements that each includes a forward attachment assembly 26, as shown in FIGS. 2 to 9. This replaces the connector 27 of the traditional harness, described above.

Figure 2:
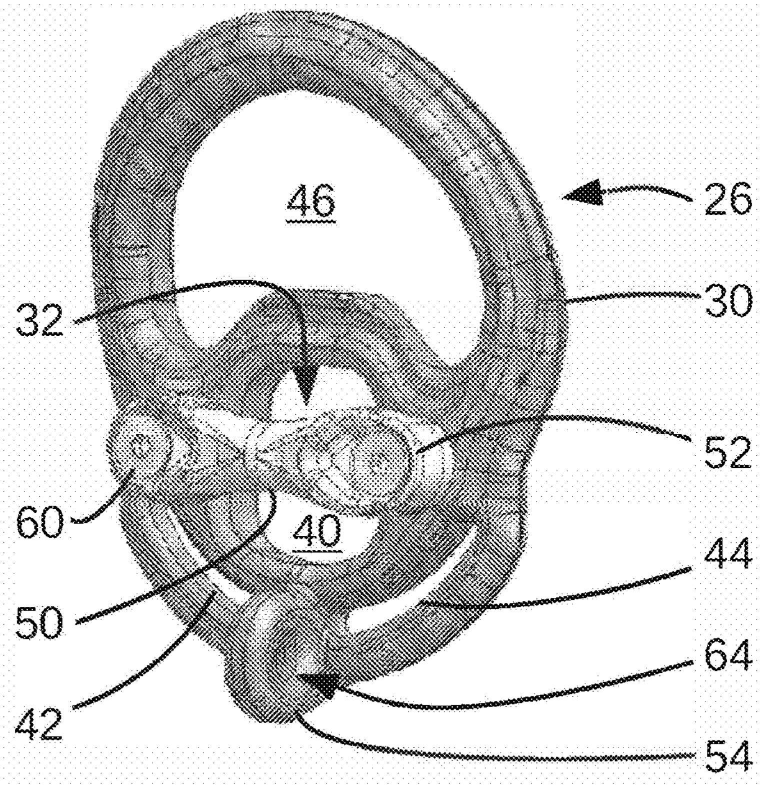
FIG. 2 shows an assembled forward attachment assembly that is used in an embodiment of the invention.

In the example shown in FIG. 2, the forward attachment assembly comprises a body 30 and an attachment bar 32. The body 30 has a generally oval or slight figure-of-8 peripheral shape and is formed from a single piece of metal by a combination of one or more of casting, forging and machining. The body 30 extends in a plane P, having inner and outer surfaces disposed to opposite sides of the plane, and its periphery can be considered as defining a region of the plane through which, several holes pass. The body is symmetrical about an axis A that extends within the plane and that forms a long axis of the body 30. (Note that while the body in this example is planar, it might alternatively be curved or include a crank, and its external shape may vary.) A bridge hole 40 is centred on the axis A approximately one third of the distance along the axis A from a first end of the axis A. The bridge hole 40 has shape that is square with rounded corners and has a dimension approximately one third of the width of the body 30 in the plane P transverse of the axis A.

A first and a second webbing slot 42, 44 are disposed to opposite sides of the axis A. Each slot 42, 44 extends from a small distance from the axis A that lies between the bridge hole 40 and a first axial end of the body 30, each slot 42, 44 being centred along an arc that is a constant distance from a proximal part of the periphery of the body 30.

The body 30 includes a lug 54 which is disposed between the webbing slots 42, 44, and projects generally perpendicularly from the plane P. A circular attachment aperture 64 passes through the lug 54.

There is an attachment hole 46 that extends symmetrically about the axis A to partially surround the bridge hole 40 and to extend to a second axial end of the body 30. This imparts the body 30 with a D-shaped attachment portion extending from the bridge hole 40 in a direction away from the webbing slots 42, 44.

All four above-described holes 40, 42, 44, 46 and the attachment aperture 64 are formed with curved peripheries and without sharp corners to avoid the creation of stress risers within the body and within any object that is passed through the hole.

Two bolt holes of circular cross-section pass through the body, at an axial position that is approximately half way along the axial extent of the bridge hole 40. Each bolt hole has one end portion, opening to the inner surface of the body 30, that is countersunk.

The attachment bar 32 has a central portion 50 of round cross-section and two securing portions 52. Each securing portion 52 has a flat mating surface. A bore extends through the securing portion 52 and opens perpendicular to the mating surface. At its opposite end, the bore has a hexagonal counterbore.

To assemble the forward attachment assembly a self-locking nut is inserted into the hexagonal counterbore of each bore in the attachment bar 32. A shaft of a respective cap screw 60 is inserted through each bolt hole in the body 30 from the countersunk end into a respective bore in the attachment bar 32 and then screwed into the nuts 58 in the attachment bar 32 and tightened such that the mating surfaces of the securing portions are clamped against the outer surface of the body 30.

Figure 3:
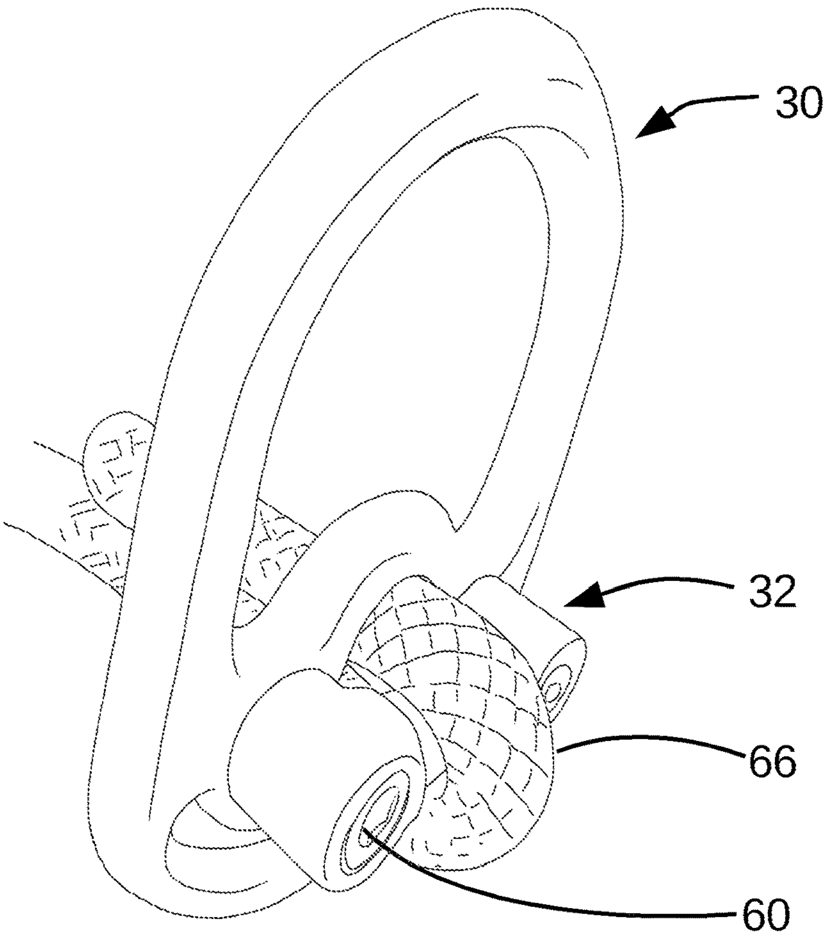
FIG. 3 shows the assembled forward attachment assembly of FIG. 2 with a flexible connection member in place.
Figure 4:
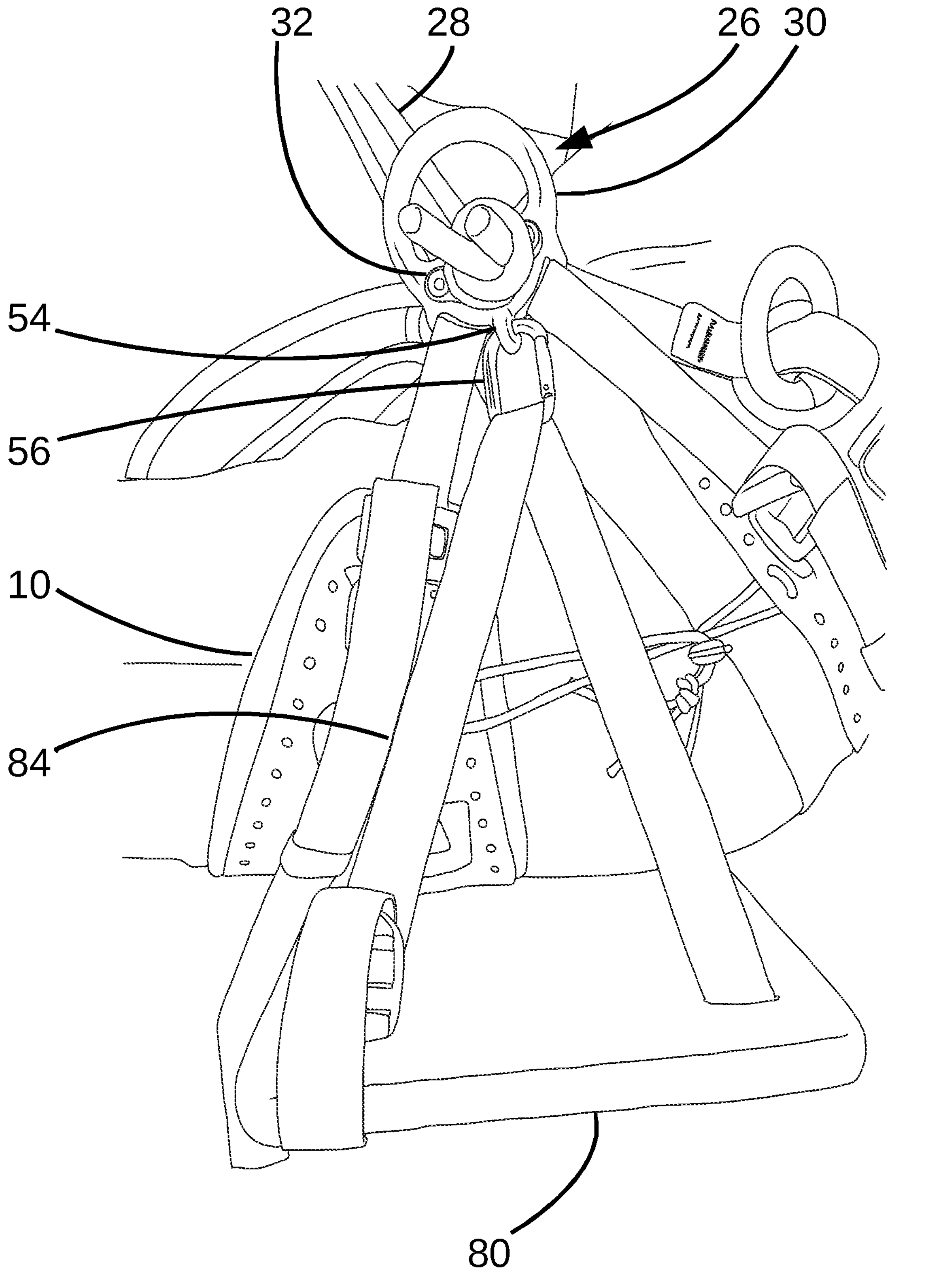
FIG. 4 is a side view of a harness and seat combination being an embodiment of the invention.

The above described attachment arrangement can be incorporated into a harness shown in FIG. 1 as a replacement for the connector 27 shown in FIG. 1. The body 30 is permanently installed in the harness by a leg riser webbing and a leg loop webbing passing through the webbing slots 42, 44. As shown in FIG. 4, the flexible load-bearing member 28 is terminated at each end by a loop 66 that is permanently formed, for example by sewing. With the attachment bar 32 disconnected from the body, each loop 66 is passed through the bridge hole 40 of the body 30 of one of the forward attachment arrangements. The attachment bar 32 is then passed into the loop 66 such that it projects by approximately equal distances from both sides of the loop 66. The forward attachment assemblies are then assembled as described in the last-preceding paragraph such that the attachment bar 32 acts as a retainer that secures the flexible load-bearing member 28 to the forward attachment assembly. This creates a secure connection between the flexible load-bearing member 28 and the forward connection arrangement, as shown in FIG. 3.

The attachment hole 46 defines a loop within the body to which a connector, such as a carabiner, can be connected. This can be used to attach anchors that will help a user to maintain a desired position, or as a point from which items can be carried.

The attachment bar 32 can be considered to be attached to the body 30 semi-permanently, in that it will not be removed during normal use of the harness. However, the connection is made in such a way that the flexible load-bearing member 28 can be removed and replaced as necessary, as part of a service operation, without the requirement that the user of the harness performs potentially risky procedures such as the formation of secure knots in the flexible load-bearing member 28.

As described above, the harness can be used to suspend a person working at height. For applications in which the person would prefer to work seated, the harness can be adapted as shown in FIG. 4.

A seat assembly comprises a rectangular seat board 80 of rigid material to act as a supporting platform upon which a person can sit Four slots are formed through the seat board 80 each being close to a respective corner of the seat board. A length of webbing, secured by a buckle or other fastener to form a continuous length, passes through each of the slots such that two loops 84 of webbing are formed, each loop extending from a respective pair of slots near opposite short edges of the seat board 80. The webbing is arranged to be adjustable in length.

To secure the seat assembly to the harness, a carabiner 56 is used to connect each loop to the lug 54 of a respective one of the forward attachment assemblies 26, the carabiner passing through the attachment aperture 64 in the lug 54. The length of the webbing is adjusted such that the spacing between the seat board 80 and the forward attachment assemblies 26 is sufficient to accommodate a user's thighs and to relieve at least part of the user's weight that would otherwise be borne by the leg loops 10 and other elements of the harness. When the seat is no longer required, the carabiners can simply be unclipped and the seat assembly can be removed from the harness.

The flexible load-bearing members 28 shown are formed of rope. However, they may have other configurations, such as being made of webbing.

In the above-described embodiments, enhanced security of attachment of the flexible load-bearing members 28 is obtained with some loss of flexibility of application, in that the length of the flexible load-bearing members 28 cannot be adjusted. Therefore, in a modification to the embodiments described above, one forward attachment arrangement is provided with means to adjust the length of the flexible load-bearing member 28.

In a variation of the above embodiments, the flexible load bearing member 28 has at least one loop that is constructed in such a way as to limit the force that it can apply to the forward attachment arrangement during normal use to provide shock absorbance in the event that the harness acts to arrest a fall.

The location of the attachment aperture 64 described above is preferred, because it ensures it is away from the riser webbing, leg webbing and rope bridge. However, the specifics of implementation and integration of the attachment aperture into a side connection assembly can vary greatly. As will be apparent from the disclosure of EP-A-3 332 840, many variations on the design of the harness are possible, and the present invention can be adapted for use with many of the embodiments described therein.

The arrangements of FIGS. 5 to 9 are some example variations on the forward attachment assembly 26 of FIG. 2.

Figure 5:
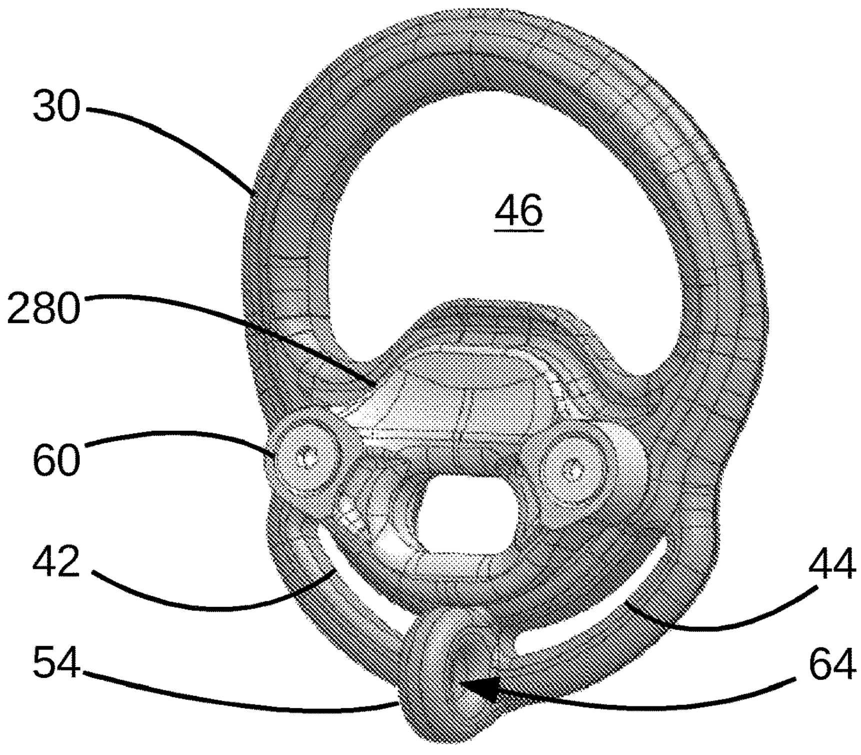
FIGS. 5 to 9 show alternative assembled forward attachment assemblies that can be used in alternative embodiments of the invention.

The forward attachment assembly of FIG. 5 uses the same body 30 as that of FIG. 2, and similar nuts and screws 60 are also included. However, the retainer of this embodiment is a knot blocking plate 280.

The knot blocking plate 280 has a periphery of size and shape such that when it is placed on the body 230 it completely covers the bridge hole 240. An inner surface of the knot blocking plate 280 has a projecting boss 282 surrounded by a flat mating surface. The boss 282 is a close fit within the bridge hole such that when the knot blocking plate 280 is placed onto the body 230, the mating surface comes into contact with the outer surface of the body 230 and the boss 282 enters the bridge hole 240 to locate the knot blocking plate 280 in the correct position on the body 230.

Two bolt holes 248 pass through the knot blocking plate 280. An end portion of each bolt hole 248 adjacent to the outer surface is countersunk at 286. A recess 288 surrounds each bolt hole 248 where it opens to the inner surface of the knot blocking plate 280. As with the attachment bar 230 described above, the presence of the ridges 254 and recesses 288 serve to locate the knot blocking plate 280 in the correct position on the body 230 and also prevents the knot blocking plate 280 being installed in the incorrect orientation. The length and diameter of the head of the screws 260 is selected such that if an attempt is made to fit the knot blocking plate 280 to the wrong surface of the body 230, the head will not enter the counterbores 262 of the bolt holes 248, and are not long enough to project from the attachment bar 232 so preventing the nuts 258 from being installed.

The knot blocking plate 280 has a central rope aperture 288 that extends between the inner and outer surfaces. The rope aperture 288 is shaped as a rounded rectangle and dimensioned such that two lengths of rope that will be used to form the bridge can pass through it side-by-side with little space between the ropes and the material surrounding the rope aperture 288. Adjacent to where it opens to the inner and outer surfaces of the knot blocking plate 280, the rope aperture 288 is flared in order that it presents no sharp or small-radius edges to a rope passing through it.

The rope bridge on a harness that uses the forward connection arrangement shown in FIG. 5 is formed by passing two ropes through the rope aperture 288 of each knot blocking plate 280 and tying suitable stopper knots in the ropes to the outside of the knot blocking plate 280.

Figure 6:
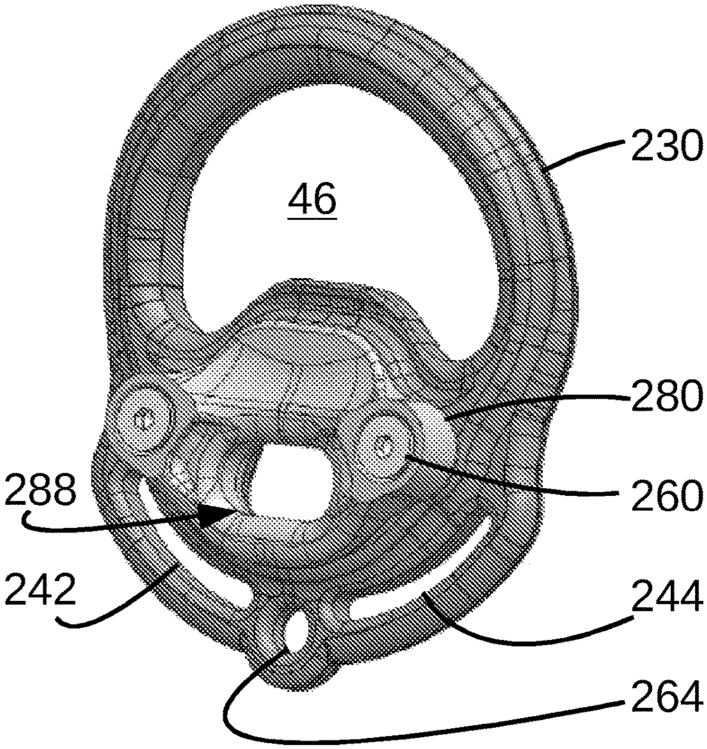

In the embodiment of FIG. 6, the same blocking plate 280 as shown in FIG. 5 is used on a different body 230. In this embodiment, the attachment aperture 264 extends through the plane of the body 230 between the webbing slots 242, 244, thus omitting the lug 54.

A forward attachment assembly 26 for use in embodiments of the invention can be constructed using the body disclosed in EP-A-3 332 840, which lacks any attachment aperture.

Figure 7:
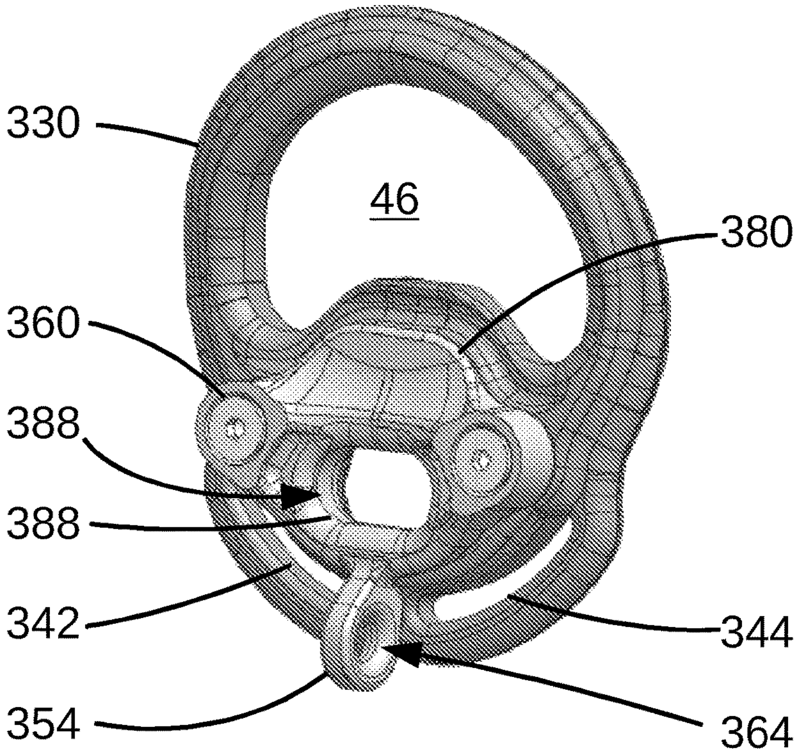

In the assembly shown in FIG. 7, the body 330 is substantially the same as that disclosed in EP-A-3 332 840; that is, it is similar to that of FIG. 6, but has no attachment aperture.

This embodiment includes a knot blocking plate 380 similar to that of FIG. 6, with the additional feature of a projecting lug 354 through which an attachment aperture 364 is formed. In the assembled connection arrangement, the lug 354 projects prom the plane of the body 330 at a position between the webbing slots 342, 344.

Figure 8:
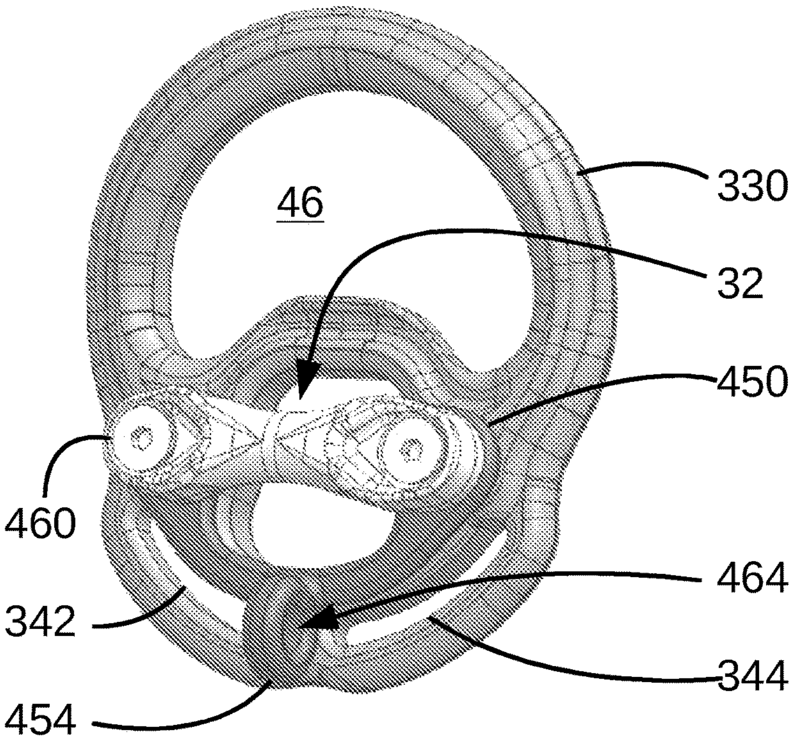

The embodiment of FIG. 8 combines the body 330 of FIG. 7 and the attachment bar 32 of FIG. 2. An adapter plate 450 is clamped between the attachment bar 32 and the body 330 using suitably lengthened bolts 460. The adapter plate 450 includes a lug 454 through which an attachment aperture 464 is formed. In the assembled connection arrangement, the lug 454 projects prom the plane of the body 330 at a position between the webbing slots 342, 344. The blocking plate 280 from FIG. 5 could be used instead of the attachment bar in a further variation.

Figure 9:
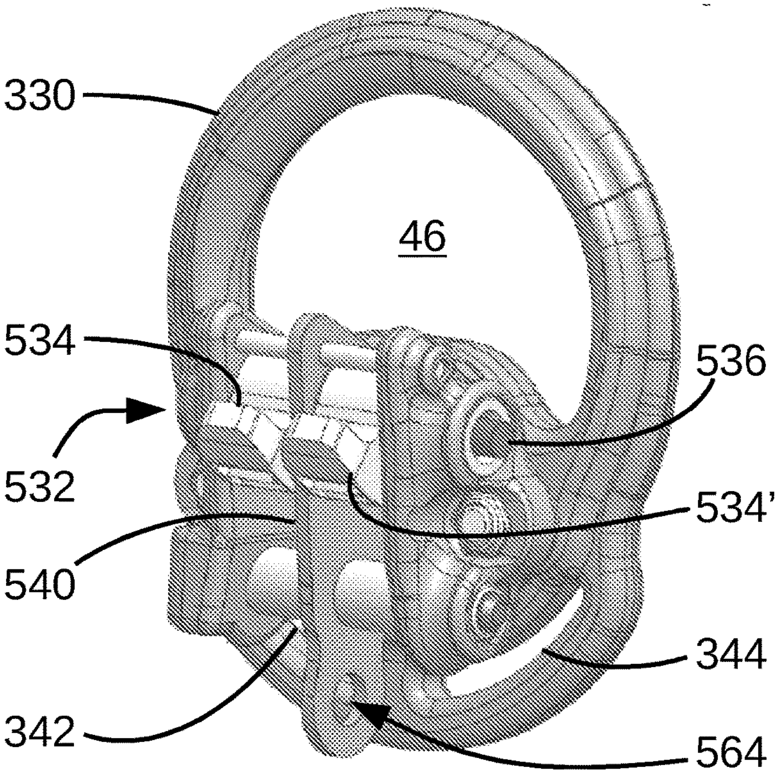

In the embodiment of FIG. 9, the retainer includes a rope adjuster assembly 532 is secured to the body 330 of FIG. 7. The rope adjuster assembly 532 comprises two rope-gripping cams 534, 534', carried on an axle bolt 536 and disposed on opposite sides of a central dividing plate 540. This allows use and independent adjustment of two flexible load-bearing members 28. In the assembled connection arrangement, part of the dividing plate 540 extends to a position between the webbing slots 342, 344, an attachment aperture 564 being formed through that part of the dividing plate 540.

The forward attachment assembly of FIGS. 10 to 14 can be used instead of that shown in the preceding figures. This forward attachment assembly is similar to that of FIG. 5, with the exception of the manner in which an attachment aperture 664 is provided on the body 630. The forward attachment assembly is shown with a retainer formed as a knot blocking plate 280, but the retainer could equally be used with the attachment bar 32 or other alternative fasteners or adjusters.

In this embodiment, the forward attachment assembly further includes a boss 638. The boss 638 has a ring portion 650 and a mounting portion 654. The mounting portion 654 has a square cross-section through which a tapped bore extends. A mounting hole 646 extends between the inner and outer surfaces of the body 630 centrally between the webbing slots 642, 644. At the outer surface, the mounting hole has a square cross-section, and at the inner surface, the mounting hole 646 is countersunk.

The mounting portion 654 of the boss 638 is received within the square section of the mounting hole 646 and the ring portion 650 projects from the front surface of the body 630, the ring portion 650 defining an attachment aperture 664. The boss 638 is retained on the body 630 by a cap screw 648 that passes though the mounting hole 646, the head of the cap screw 648 being received within the countersunk section of the mounting hole 646.

Figure 10:
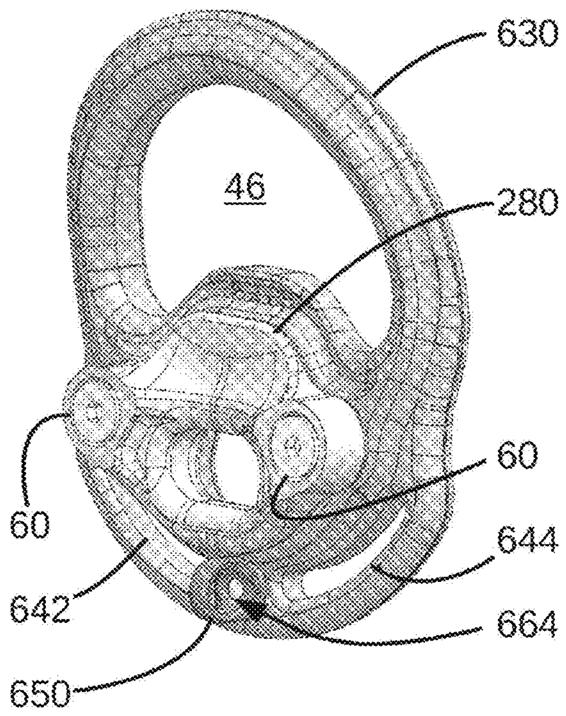
FIGS. 10 to 13 show a further alternative forward attachment assembly that can be used in embodiments of the invention.
Figure 11:
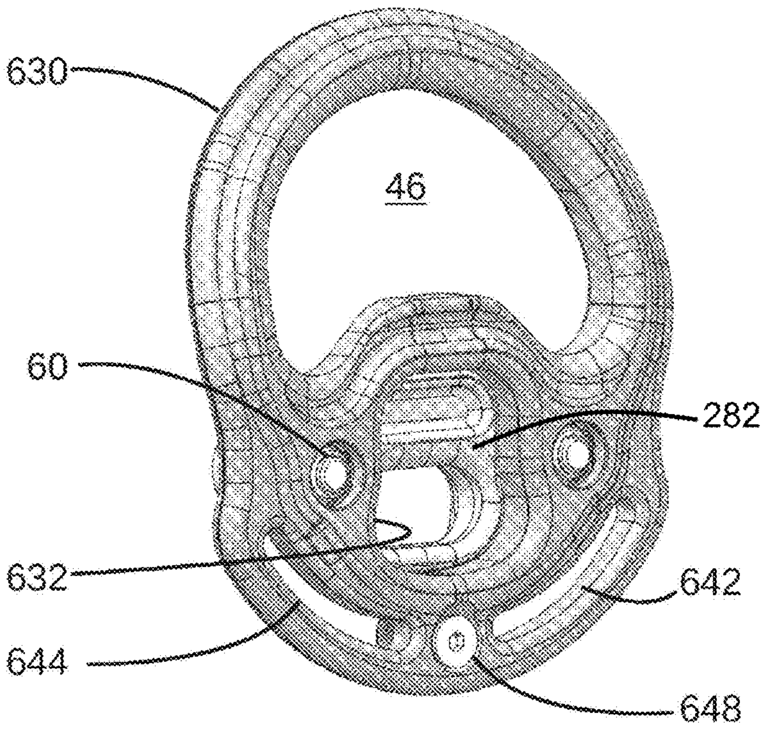
Figure 12:
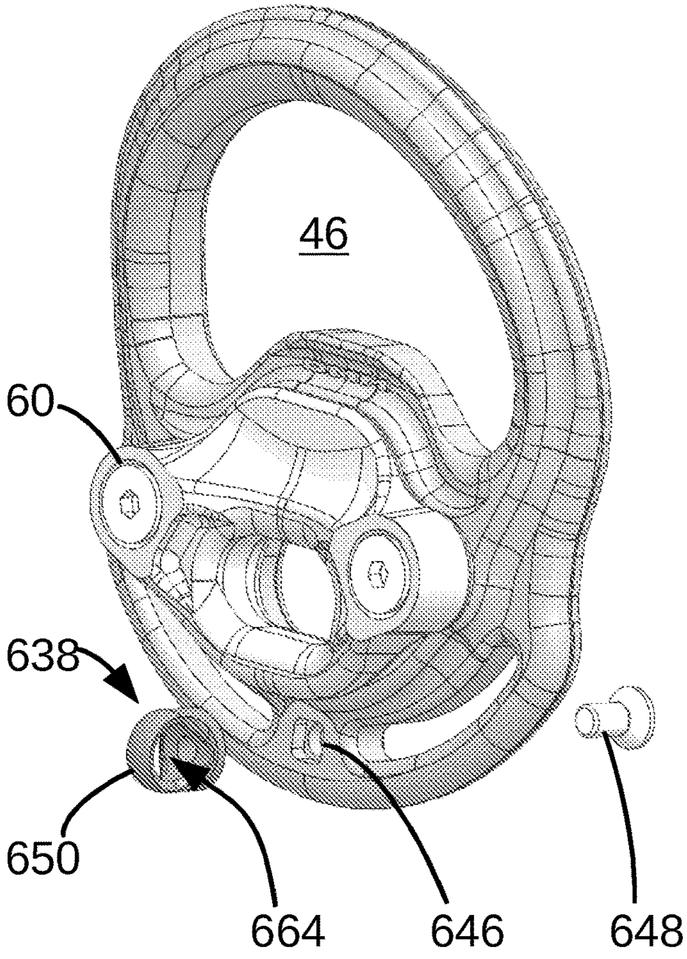
Figure 13:
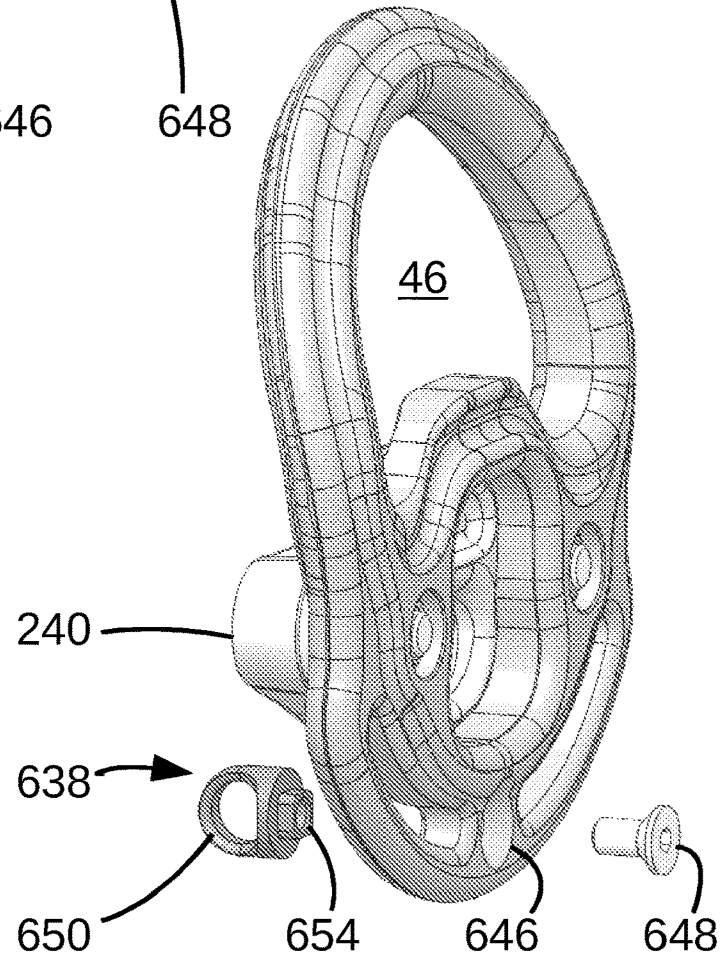
Figure 14:
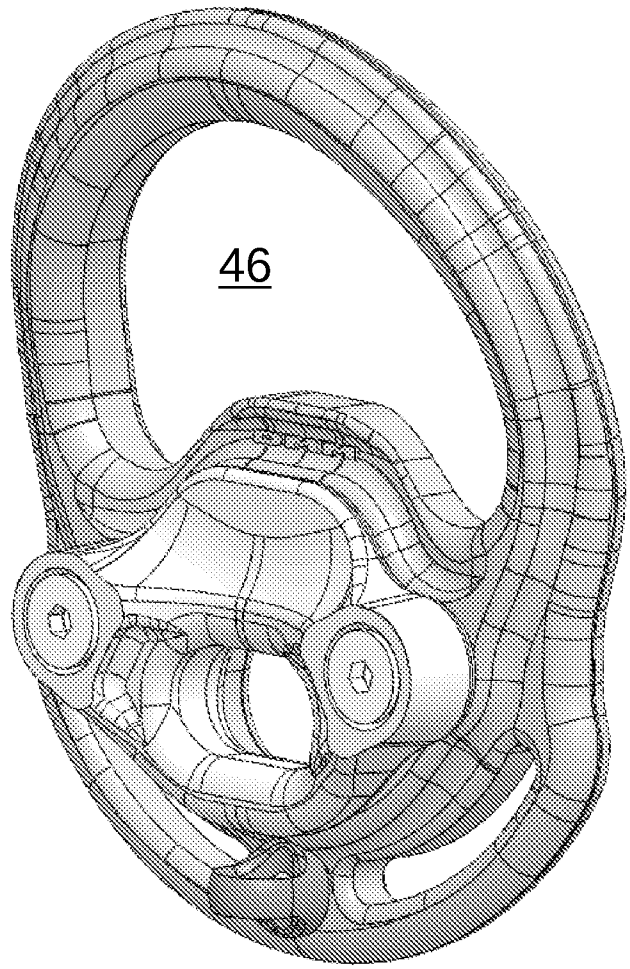
FIG. 14 shows an alternative configuration of the forward attachment assembly of FIGS. 10 to 13.

The mounting portion 654 of the boss 638 is a close fit in the square section of the mounting hole 646, which prevents its rotation about the axis of the cap screw 648. Because the mounting portion 654 has a square section, it can be inserted into the attachment aperture 664 in two orientations: as shown in FIGS. 10 to 12 with the attachment aperture 664 extending between the webbing slots 642, 644 (similar to the attachment apertures in the preceding embodiments) or, as in FIG. 14, rotated through 90° as compared with the preceding embodiments.

It should be noted that it will normally be necessary to provide a rope adjuster assembly on one of two forward attachment arrangements, with the other using a fixed connection.

Although some components described above have been formed from rope and some from webbing, the skilled person will realise that, in many cases, one can be substituted for the other.

The invention claimed is:

1. An apparatus for supporting a person working at height, the apparatus comprising:
- a seat assembly comprising:
  - a supporting platform,
  - flexible connection members secured to the supporting platform,
- and
  - a connector on each flexible connection member; and
- a harness comprising:
  - a back,
  - two leg loops,
  - two forward connection arrangements, and
  - a flexible load-bearing member that extends between the two forward connection arrangements, the forward connection arrangements being configured to transfer a load from the back and the leg loops to the load-bearing member,
- wherein each forward connection arrangement comprises:
  - a body that is permanently connected to the harness, the body comprising:
    - a bridge hole passing through the body, and
    - an attachment aperture, separate from the bridge hole and extending through a planar part of a body of a respective attachment arrangement in a direction parallel to the plane of the planar part of the body, through which a respective said connector is configured to pass to releasably connect the connector and the attached flexible connection members to the forward connection arrangements, and
  - a retainer configured to secure the flexible load bearing member to the body;
- wherein the apparatus is configured so that a load carried on the supporting platform is transferred through the flexible connection members, the connectors and the forward connection arrangements to the flexible load-bearing member.

2. The apparatus of claim 1, wherein the attachment aperture of one of the forward connection arrangements or both of the forward connection arrangements is formed within the body.

3. The apparatus of claim 1, wherein the attachment aperture extends through the planar part of the body of the respective attachment arrangement in a direction normal to the plane of the planar part of the body.

4. The apparatus of claim 1, wherein the attachment aperture is centered about an axis that is offset from the plane of the planar part of the body.

5. The apparatus of claim 4, wherein the attachment aperture is formed through a boss that is part of the body.

6. The apparatus of claim 1, wherein the attachment aperture of one of the forward connection arrangements or both of the forward connection arrangements is formed within the retainer.

7. The apparatus of claim 6, wherein the attachment aperture extends through the retainer or a part thereof.

8. The apparatus of claim 1, wherein the flexible load-bearing member is releasably connected to the retainer whereby the flexible load-bearing member is configured to be disconnected from the harness.

9. The apparatus of claim 1, wherein each connector is one of a carabiner or a shackle.

10. The apparatus of claim 1, wherein the flexible connection members are adjustable in length.

11. The apparatus of claim 1, wherein the harness is one of a work-positioning sit harness or a full-body harness.

12. An apparatus for supporting a person working at height, the apparatus comprising:
a seat assembly comprising:
a supporting platform,
flexible connection members secured to the supporting platform,
and
a connector on each flexible connection member; and
a harness comprising:
a back,
two leg loops,
two forward connection arrangements, and
a flexible load-bearing member that extends between the two forward connection arrangements, the forward connection arrangements being configured to transfer a load from the back and the leg loops to the load-bearing member,
wherein each forward connection arrangement comprises:
a body that is permanently connected to the harness, the body comprising:
a bridge hole passing through the body, and
an attachment aperture, separate from the bridge hole and extending through a component secured to the body, through which a respective said connector is configured to be passed to releasably connect the connector and the attached flexible connection members to the forward connection arrangements, and
a retainer configured to secure the flexible load bearing member to the body,
wherein the apparatus is configured so that a load carried on the supporting platform is transferred through the flexible connection members, the connectors and the forward connection arrangements to the flexible load-bearing member.

13. The apparatus of claim 12, wherein the component is configured to be secured to the body in one of several configurations to provide the attachment aperture in one of several orientations.

14. An apparatus for supporting a person working at height, the apparatus comprising:
a seat assembly comprising:
a supporting platform,
flexible connection members secured to the supporting platform,
and
a connector on each flexible connection member; and
a harness comprising:
a back,
two leg loops,
two forward connection arrangements, and
a flexible load-bearing member that extends between the two forward connection arrangements, the forward connection arrangements being configured to transfer a load from the back and the leg loops to the load-bearing member,
wherein each forward connection arrangement comprises:
a body that is permanently connected to the harness, the body comprising:
a bridge hole passing through the body, and
an attachment aperture, separate from the bridge hole and passing through the body, through which a respective said connector is configured to be passed to releasably connect the connector and the attached flexible connection members to the forward connection arrangements, and
a retainer configured to secure the flexible load bearing member to the body, the retainer being releasably connected to the body whereby the flexible load-bearing member is configured to be disconnected from the harness,
wherein the apparatus is configured so that a load carried on the supporting platform is transferred through the flexible connection members, the connectors and the forward connection arrangements to the flexible load-bearing member.

15. An apparatus for supporting a person working at height, the apparatus comprising:
a seat assembly comprising:
a supporting platform,
flexible connection members secured to the supporting platform,
and
a connector on each flexible connection member; and
a harness comprising:
a back,
two leg loops,
two forward connection arrangements, and
a flexible load-bearing member that extends between the two forward connection arrangements, the forward connection arrangements being configured to transfer a load from the back and the leg loops to the load-bearing member,
wherein each forward connection arrangement comprises:
a body that is permanently connected to the harness, the body comprising:
a bridge hole passing through the body, and
an attachment aperture, separate from the bridge hole and passing through the body, through which a respective said connector is configured to be passed to releasably connect the connector and the attached flexible connection members to the forward connection arrangements, and
a retainer configured to secure the flexible load bearing member to the body,
wherein the apparatus is configured so that a load carried on the supporting platform is transferred through the flexible connection members, the connectors and the forward connection arrangements to the flexible load-bearing member, and
wherein the retainer and body are configured so that when the retainer is secured to the body, the retainer covers a portion of the bridge hole, effectively reducing a size of the bridge hole.

16. An apparatus for supporting a person working at height, the apparatus comprising:
a seat assembly comprising:
a supporting platform, flexible connection members secured to the supporting platform, and a connector on each flexible connection member; and a harness comprising:

a back, two leg loops, two forward connection arrangements, and a flexible load-bearing member that extends between the two forward connection arrangements, the forward connection arrangements being configured to transfer a load from the back and the leg loops to the load-bearing member, wherein each forward connection arrangement comprises:

a body that is permanently connected to the harness, the body comprising:

a bridge hole passing through the body, and an attachment aperture, separate from the bridge hole and passing through the body, through which a respective said connector is configured to be passed to releasably connect the connector and the attached flexible connection members to the forward connection arrangements, and a retainer configured to secure the flexible load bearing member to the body;

wherein the apparatus is configured so that a load carried on the supporting platform is transferred through the flexible connection members, the connectors and the forward connection arrangements to the flexible load-bearing member, and wherein the retainer and the body are configured so that when the retainer is secured to the body, the retainer passes across the bridge hole, effectively dividing the bridge hole into two separate openings.

17. An apparatus for supporting a person working at height, the apparatus comprising:

a seat assembly comprising:

a supporting platform, flexible connection members secured to the supporting platform, and a connector on each flexible connection member; and a harness comprising:

a back, two leg loops, two forward connection arrangements, and a flexible load-bearing member that extends between the two forward connection arrangements, the forward connection arrangements being configured to transfer a load from the back and the leg loops to the load-bearing member, wherein each forward connection arrangement comprises:

a body that is permanently connected to the harness, the body comprising:

a bridge hole passing through the body, and an attachment aperture, separate from the bridge hole and extending through a component secured to the body, through which a respective said connector is configured to be passed to releasably connect the connector and the attached flexible connection members to the forward connection arrangements, and a first retainer configured to secure the flexible load bearing member to the body;

wherein the apparatus is configured so that a load carried on the supporting platform is transferred through the flexible connection members, the connectors and the forward connection arrangements to the flexible load-bearing member, and wherein the apparatus further comprises a second retainer, either of the first and second retainers being releasably connectable to the body.

18. The apparatus of claim 17, wherein the first retainer is configured so that when the first retainer is secured to the body, the first retainer covers a portion of the bridge hole, effectively reducing a size of the bridge hole.

* * * * *